US010735793B1

(12) United States Patent
Bhattacharya

(10) Patent No.: US 10,735,793 B1
(45) Date of Patent: Aug. 4, 2020

(54) RECORDING AND PLAYING BACK IMAGE VARIATIONS

(71) Applicant: ADOBE INC., San Jose, CA (US)

(72) Inventor: Joydeep Bhattacharya, Bangalore (IN)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 16/355,280

(22) Filed: Mar. 15, 2019

(51) Int. Cl.
| H04N 21/262 | (2011.01) |
| H04N 21/2747 | (2011.01) |
| H04N 21/433 | (2011.01) |
| H04N 21/854 | (2011.01) |
| H04N 21/482 | (2011.01) |
| H04N 21/84 | (2011.01) |
| H04N 21/234 | (2011.01) |

(52) U.S. Cl.
CPC . H04N 21/26258 (2013.01); H04N 21/23418 (2013.01); H04N 21/2747 (2013.01); H04N 21/4334 (2013.01); H04N 21/4825 (2013.01); H04N 21/84 (2013.01); H04N 21/85406 (2013.01)

(58) Field of Classification Search
None
See application file for complete search history.

(56) References Cited

U.S. PATENT DOCUMENTS

| 9,641,566 B1* | 5/2017 | Hiremath | H04N 21/2743 |
| 2017/0010903 A1* | 1/2017 | Kidron | G06F 3/0482 |
| 2017/0109122 A1* | 4/2017 | Schmidt | G06F 3/1454 |

OTHER PUBLICATIONS

Video JSON Object Specificaton, https://help.aolonnetwork.com/hc/en-us/articles/210177233-Video-JSON-Object-Specification May 20, 2016.

* cited by examiner

Primary Examiner — Omar S Parra
(74) Attorney, Agent, or Firm — F. Chau & Associates, LLC

(57) ABSTRACT

The present disclosure relates to a cloud-based system that records and plays back video images. The system includes a recorder service executing on a server and a client application executing on one or more client devices. The client application includes a player program and a recorder program. The recorder program captures screenshots based on a pre-defined list of events and sends the screenshots and a build request referencing the screenshots to the recorder service. The recorder service generates a play file in response to receipt of the build request using the screenshots. The play file includes metadata referencing variation images generated from the screenshots. The play file is configured to be accessible by any of the client devices for generation and playback of a video using the player program.

20 Claims, 15 Drawing Sheets

```
{
  "frames": {
    "frame_0": ["img1_0_0.png", "img1_0_1.png",
                "img1_0_2.png", "img1_1_0.png",
                "img1_1_1.png", "img1_2_0.png",
                "img1_2_1.png"], "frame_1": ["img2_0_0.png", "img2_0_1.png",
                "img2_0_2.png", "img2_1_0.png",
                "img2_1_2.png", "img2_2_0.png",
                "img2_2_1.png", "img2_2_2.png"], "frame_2": ["img3_0_0.png", "img3_0_2.png",
                "img3_2_0.png"]
  },
  "metadata": {
    "rows": 3,
    "cols": 3,
    "pixel_size": 100,
    "subtitle_position": "bottom",
    "video_delay": 1000,
    "frames_count": 3,
    "type": "fragmented"
  },
  "subtitles": {
    "frame_0": "Simple A",
    "frame_1": "A with square",
    "frame_2": "A with a rounded square"
  }
}
```

FIG. 8

```
{
  "frames": {
      "frame_0": "stitched_0.png",
      "frame_1": "stitched_1.png",
      "frame_2": "stitched_2.png"
  },
  "metadata": {
      "rows": 3,
      "cols": 3,
      "pixel_size": 100,
      "subtitle_position": "bottom",
      "video_delay": 1000,
      "frames_count": 3,
      "type": "stitched"
  },
  "subtitles": {
      "frame_0": "Simple A",
      "frame_1": "A with square",
      "frame_2": "A with a rounded square"
  }
}
```

FIG. 10

RECORDING AND PLAYING BACK IMAGE VARIATIONS

BACKGROUND

1. Technical Field

This disclosure relates to techniques for recording video images and playing back a processed version of the video images, and more particularly to, techniques for recording and playing back image variations.

2. Discussion of Related Art

Conventional screencast software enables users to create screencasts to demonstrate how to use software. The screencast may include video and an audio narration. A screencast can be stored as a multimedia file including the video and the audio. Examples of such multimedia files include a flash video file, a moving pictures experts group (MPEG) file, and an audio video interleaved (AVI) file.

Creating screencasts for tutorials and demonstrations is a time consuming process. Moreover, finding the right recorder is often challenging. The video for the screencast may be captured using conventional video capture software. However, since these programs typically capture about 25 frames per second, a file of a very large size is created. Further, many of these files are needed when creating a tutorial to explain a very complex topic.

Since the resulting files are large in size and numerous, it can be difficult to store multiple recordings when storage space is limited. Further, the size of these files may prevent them from being sent via electronic mail (e-mail) since many e-mail programs limit the size of an attachment to between 10 and 25 megabytes. Additionally, it can take an exceedingly long period of time to communicate these large files to a remote destination over a computer network when the communication bandwidth is limited. Moreover, the larger the file, the more main memory a computer needs to begin playing the file.

Further, conventional video capture software typically capture many ambiguous frames, where the user has either not performed an action or has not performed a relevant action. Thus, a user watching such a tutorial wastes a great deal of time waiting for the relevant actions to be presented.

Moreover, creating documentation is a tedious task, where the development team needs to sync with the documentation team. Often, the created documentation is out of sync with the captured video due to knowledge gaps and operational challenges that results in ambiguous documentation.

Thus, there are several technical problems with regard to conventional systems that generate screencasts.

BRIEF SUMMARY

Embodiments of the present disclosure solve the foregoing problems in the art with systems, non-transitory computer-readable media, and methods for accurately and efficiently recording and playing back video images. The videos (e.g., for tutorials and demonstrations) created in this manner have a drastically reduced size as compared to those created by conventional video capture software.

At least one exemplary embodiment of the present disclosure provides a cloud-based system that records and plays back video images. The system includes a cloud-based service having a recorder service configured to execute on a host server and a client application program. The host server is configured to connect to a plurality of client devices over a computer network. The client application program is stored in the plurality of client devices and is configured to be executed by at least one of the client devices. The client application program includes a player program and a recorder program. The recorder program is configured to capture a sequence of screenshots based on a pre-defined list of events and send the captured sequence and a build request referencing the sequence across the computer network to the cloud-based service. The recorder service is configured to generate a play file in response to receipt of the build request by dividing each of the screenshots received across the computer network into a plurality of image fragments, comparing the image fragments between the screenshots to determine variations among the screenshots, determining relevant fragments among the image fragments for each screenshot based on the variations, stitching the relevant fragments of each screenshot to generate a stitched image for each screenshot, and generating the play file including metadata referencing the stitched images. The play file is configured to be accessible by any of the client devices for generation and playback of a video using the player program.

At least one exemplary embodiment of the present disclosure provides a computer-implemented method for generating a play file configured to enable play back of video images. The method includes a cloud-based service storing screenshots received across a computer network from a client application program; the cloud-based service generating a play file in response to receiving a build request from the client application program; and the cloud-based service configuring the play file to be accessible by the client application program for generation and playback of a video. The build request references a sequence of the screenshots. The generating of the play file includes: dividing each of the screenshots into a plurality of image fragments, comparing the image fragments between the screenshots to determine variations among the screenshots, determining relevant fragments among the image fragments for each screenshot based on the variations, stitching the relevant fragments of each screenshot to generate a stitched image for each screenshot, and generating the play file including metadata referencing the stitched images. For example, a video may be simulated from the play file and the stitched images.

At least one exemplary embodiment of the present disclosure provides a computer-implemented method for managing a client application program to record and play back video images. The method includes the client application program using an event handler to perform a screen capture to create a captured image file each time one of a plurality of pre-defined events occurs; the client application program outputting in sequence the captured image files across a computer network to a cloud-based service; the client program generating a build request identifying the captured image files and outputting the build request to the cloud-based service. The method further includes the client application program accessing a play file received from the cloud-based service, the play file including metadata referencing image variations in the captured image files. The method then includes the client application program presenting the image variations sequentially on a display device using a player processing the metadata.

Additional features and advantages of the above embodiments and additional embodiments of the present disclosure are outlined in the description which follows, and in part will be obvious from the description, or may be learned by the practice of such example embodiments.

BRIEF DESCRIPTION OF THE DRAWINGS

The detailed description describes one or more embodiments with additionally specificity and detail through use of the accompanying drawings, briefly described below.

FIG. 8 illustrates an example of the play file during a fragmented mode of operation.

FIG. 10 illustrates an example of the play file during a stitched mode of operation.

DETAILED DESCRIPTION OF THE EXEMPLARY EMBODIMENTS

Figure 1A:
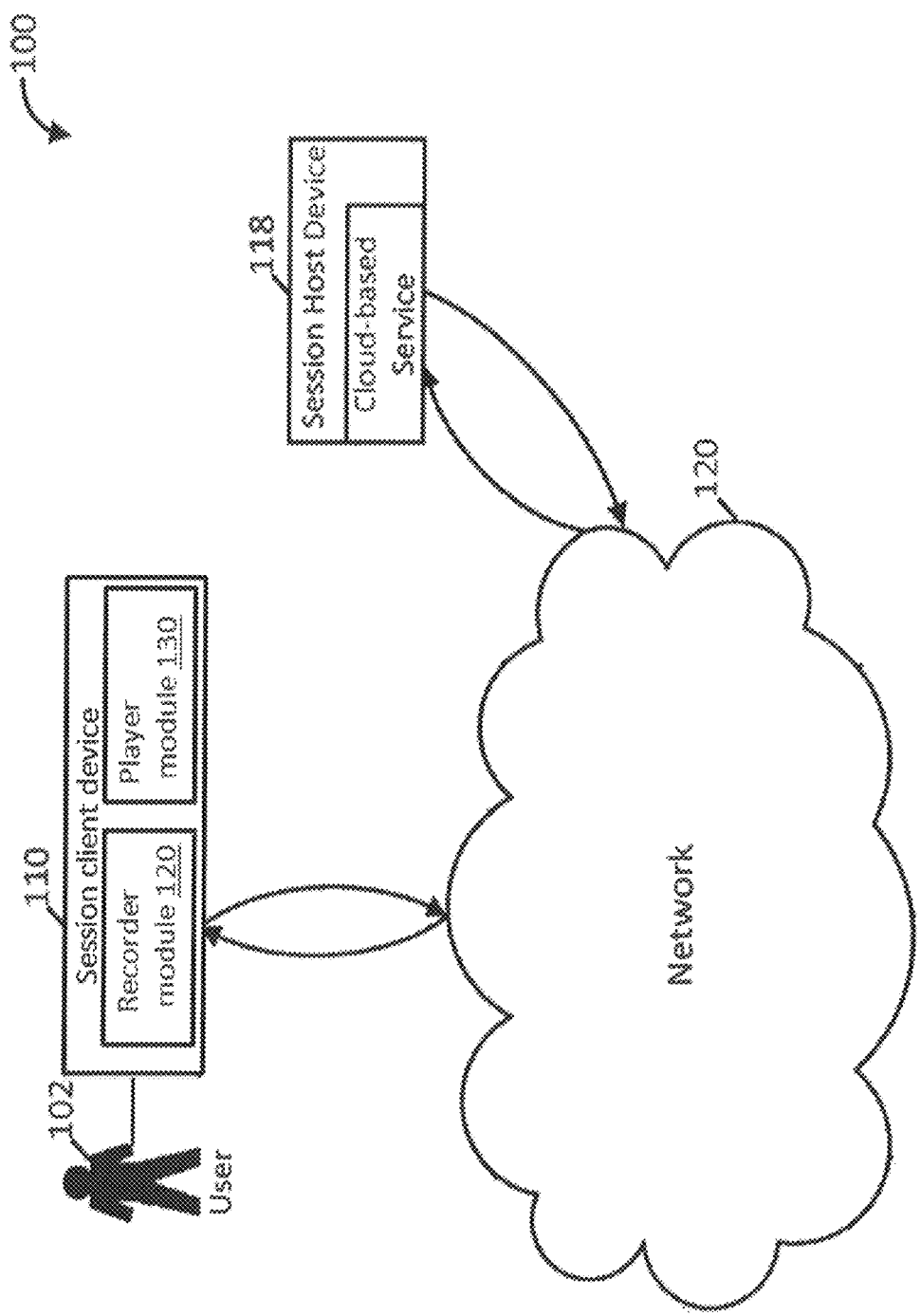
FIG. 1A is a block diagram illustrating a cloud-based system for recording images and playing back image variations according to an exemplary embodiment of the inventive concept.

One or more embodiments of the present disclosure include a cloud-based system that records images and plays back image variations based on the recorded images. For example, the cloud-based system can be easily integrated with various applications (e.g., content management systems, integrated development environments, Web-based applications, stand-alone applications, Internet Browsers, etc.) for demonstrations and tutorials.

A cloud-based system according to an embodiment comprises a recorder that captures screenshots based on various types of trigger events (e.g., time delay, keyboard/mouse events, document object model changes, etc.) and a player. The recorder posts the captured screenshots to a cloud-based recording service, which processes image variations of the screenshots to produce a play file that can be processed by the player to playback a pseudo video experience. The play file is very small in size, up to about 90% smaller than the size of the recorded video. The player, which runs on the client side, reconstructs from the play file the recorded video to provide a pseudo video experience. The player can be embedded into a Web-based application, a browser plug-in, or a desktop-based application. Thus, implementations of the system can be tailored to the specific client needs.

The system captures screenshots based on various types of configurations, thereby capturing only the relevant frames of the demonstration, tutorial, and the like.

One or more embodiments of the system capture a sequence of screenshots based on various events (e.g., keyboard, mouse, touchscreen, joystick, time, document object model change), compress the captured sequence when necessary, resize the captured sequence when necessary, split the result into multiple frames, compare these frames for variation, generate variation metadata based on the variation, and generate a play file based on the variation metadata for use by the player to simulate a video-like experience.

One or more embodiments of the system are capable of achieving 75-90% savings on file size as compared to traditional video recorder/players, which means that the play file can be embedded along with a local client application that is used to play the play file. Alternately, the play file can be stored and played from the Cloud.

One or more embodiments of the system are capable of achieving a 75-80% reduction in the number of frames captured. Since the pseudo video effect is created by image differences of image fragments and text, embodiments of the system may eliminate buffering, slow internet, and low latency scenarios.

One or more embodiments of the system may be used to build tutorials that provide incisive information to consumers on new product features and feature changes on a granular level using a state of the art minimal footprint player. Thus, a lossless channel of communication can be created between developers and end-users.

One or more embodiments of the system provide a light-weight cloud based implementation that can reduce storage expenses, training expenses, and the amount of time taken to create training material and documentation, which is not achievable by previous video capture tools.

Further, embodiments of the system may provide configurable output for different applications (e.g., Web-based, desktop-based, app-based, etc.) to enhance the user experience. Moreover, embodiments of the system may solve inadequate documentation issues by providing visuals along with help text.

Additionally, one or more embodiments of the system can optimize the size as well as the length of video, by removing the redundant time wasted while recording a tutorial. Further, one or more embodiments of the system, capture images into a play file based on relevant events, without requiring an additional video player to play the play file.

FIG. 1A is a block diagram illustrating a cloud-based system that records images and plays back image variations based on the record images according to an exemplary embodiment of the inventive concept.

As shown in FIG. 1A, the system 100 includes a client device 110, a host device 118, and a communication network 120. The client device 110 may include a recorder module 120 and a player module 130. User 102 is illustrated as being a user of the system 100. In an exemplary embodiment, the user 102 uses a browser of the client device 110 to navigate to a website, downloads a plugin/extension from the website that installs the recorder module 120 and the player module 130 onto the client device 110. The plugin/extension may become part of the browser. While the above describes uses of a single plugin/extension to install both modules, in alternate embodiment, separates plugins/extensions are used to install these modules. Further, both modules need not be installed on the same client device. For example, a first client device can be used to make the recordings while a second client device is used to playback the recordings. While a single user 102 is illustrated, the system 100 is not limited thereto, and may include multiple users. While a single client device 110 is illustrated, the system 100 is not limited thereto, and may include multiple client devices.

Each of the client device 110 and the host device 118 and at least some portion of the communication network 120 are or include one or more programmable devices. These programmable devices may be any of a variety of standardized and special purpose devices, such as personal computers, workstations, servers, cellular telephones, and personal digital assistants. Broadly stated, the network 120 may include any communication network through which programmable devices may exchange information. For example, the network 120 may be a public network, such as the Internet, that is implemented with various IP-based network forwarding devices. The network 120 may also be or include other public or private networks such as LANs, WANs, cellular networks, extranets and intranets.

In some embodiments, the network 120 is configured to communicate (e.g., transmit or receive) information with connected programmable devices, such as the client device 110 and the host device 118. The network 120 may be configured to communicate both synchronous information streams and asynchronous information packets. When executing according to its configuration in one example, the network 120 receives streams including image data, requests (e.g., a build request), or acknowledgements from the client device 110 for transmission to the host device 118 and receives streams including image data, a play file, requests, or acknowledgements from the host device 118 for transmission to the client device 110. When executing according to another configuration, the network 120 receives packets including image data, requests or acknowledgements from the client device 110 for transmission to the host device 118 and receives packets including image data, a play file, requests, or acknowledgements from the host device 118 for transmission to the client device 110.

In some embodiments illustrated by FIG. 1A, the client device 110 is configured to execute one or more processes that support a communication session between the client device 110 and the host device 118. In these embodiments, the client device 110 is configured to execute one or more processes that transmit packets including image data, requests, or acknowledgments to the host device 118. When executing according to this configuration, the client device 110 implements a variety of components described below with reference to FIG. 2.

Figure 1B:
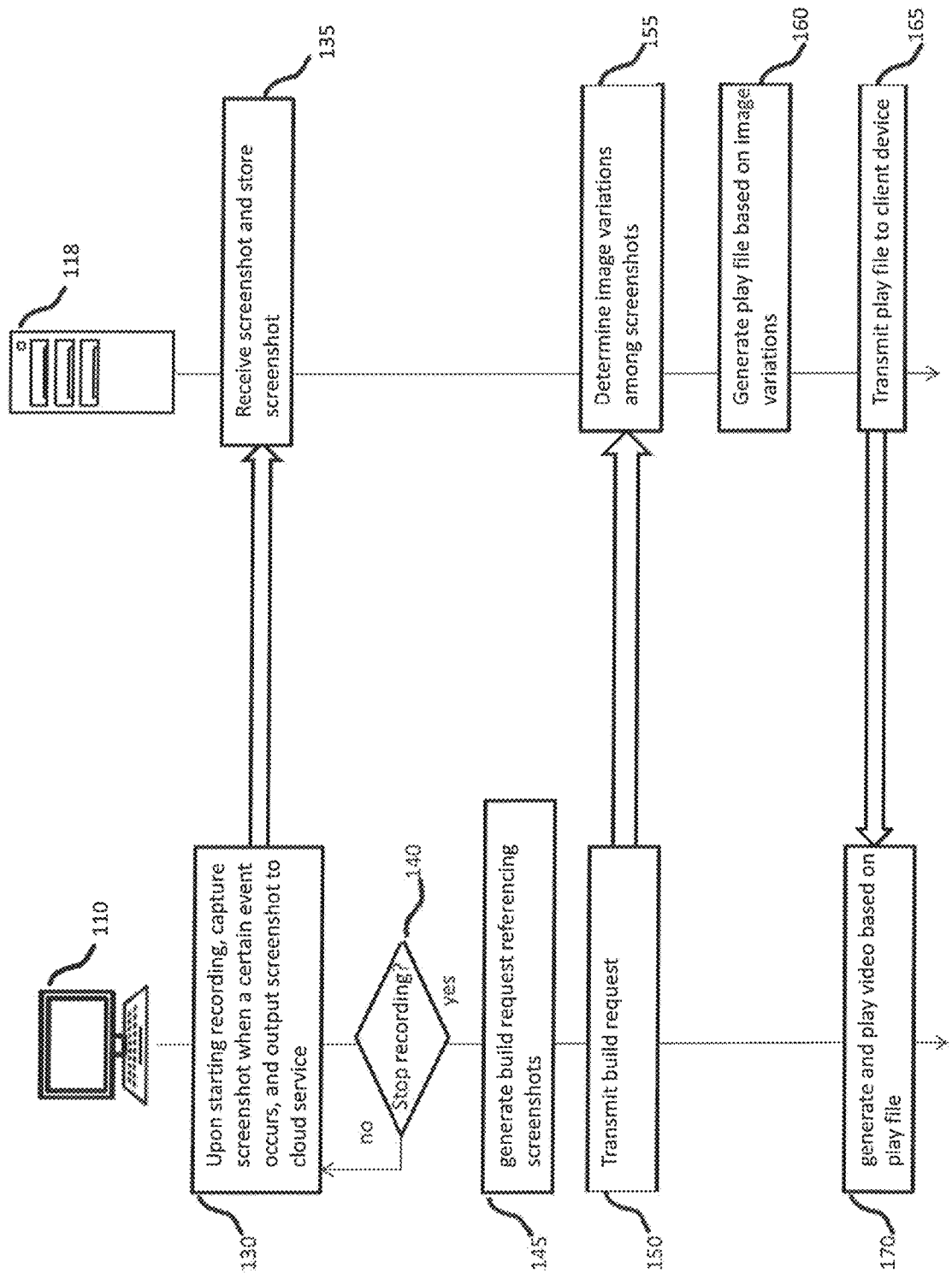
FIG. 1B shows an exemplary workflow of the system according to an exemplary embodiment of the inventive concept.

FIG. 1B illustrates an exemplary workflow between the client device 110 and the host device 118 to record video images, generate a video based on the recorded images, and play the video. The workflow includes, upon starting a recording on the client device 110, the client device 110 capturing a screenshot when a certain event occurs, and outputting the screenshot to a cloud-service managed by the host device 118 (step 130). The types of the certain event will be discussed in more detail below. The starting of the recording maybe triggered by the user 102 invoking the recorder module 120 using a graphical user interface (GUI) of the client device 110. The host device 118 then receives the screenshot and stores the screenshot (step 135). The step 130 of capturing the screenshot may be repeated multiple times until the user 102 has stopped the recording. Once the user 102 has stopped the recording (e.g., using the GUI), the client device 130 generates a build request referencing the previously captured screenshots (step 145). The build request will be discussed in more detail below (e.g., see FIG. 8). Thus, a screenshot is sent to the host device 118 each time it is captured.

According to an alternate embodiment of the present invention, the screenshots may be collected in a sequence and sent together to the host device 118. For example, in this alternate embodiment, all the previously captured screen captures are sent when the user 102 stops the recording. Next, the client device 110 sends the build request to the host device 118. In response to receiving the build request, the host device 118 determines image variations among the screenshots (step 155). The host device 118 then generates a play file based on the image variations (step 160). The play file will be discussed in more detail below (e.g., see FIG. 4). The host device 118 then makes the play file accessible to the client device 110 or any other client device in the system. For example, the host device 118 can transmit the play file to the client device 110 (step 165) or store the play file in a directory accessible by any client device 110 in the system. The client device 110 then generates a video from the play file and enables the user 102 to play the video (step 170). For example, the player module 130 may generate the video using metadata within the play file that references image variations generated by the host device 118 and enable the user 102 to play the video.

For example, the metadata may include first metadata identifying a first image file that represents a first one of the image variations and including first help text describing the first image variation, second metadata identifying a second image file that represents a second one of the image variations and including second help text describing the second image variation, third metadata identifying a third image file that represents a third one of the image variations and including third help text describing the third image variation, etc. In this example, the player module 130 generates the video by overlaying the first help text with an image of the first image file to generate a first overlaid image, overlaying the second help text with an image of the second image file to generate a second overlaid image, by overlaying the third help text with an image of the third image file to generate a third overlaid image, etc., and plays the video by sequentially outputting the overlaid images to a display device of the client device 110. The player module 130 may introduce some delay between the output overlaid images to ensure the user 102 has enough time to perceive each image and its corresponding help text.

Figure 2:
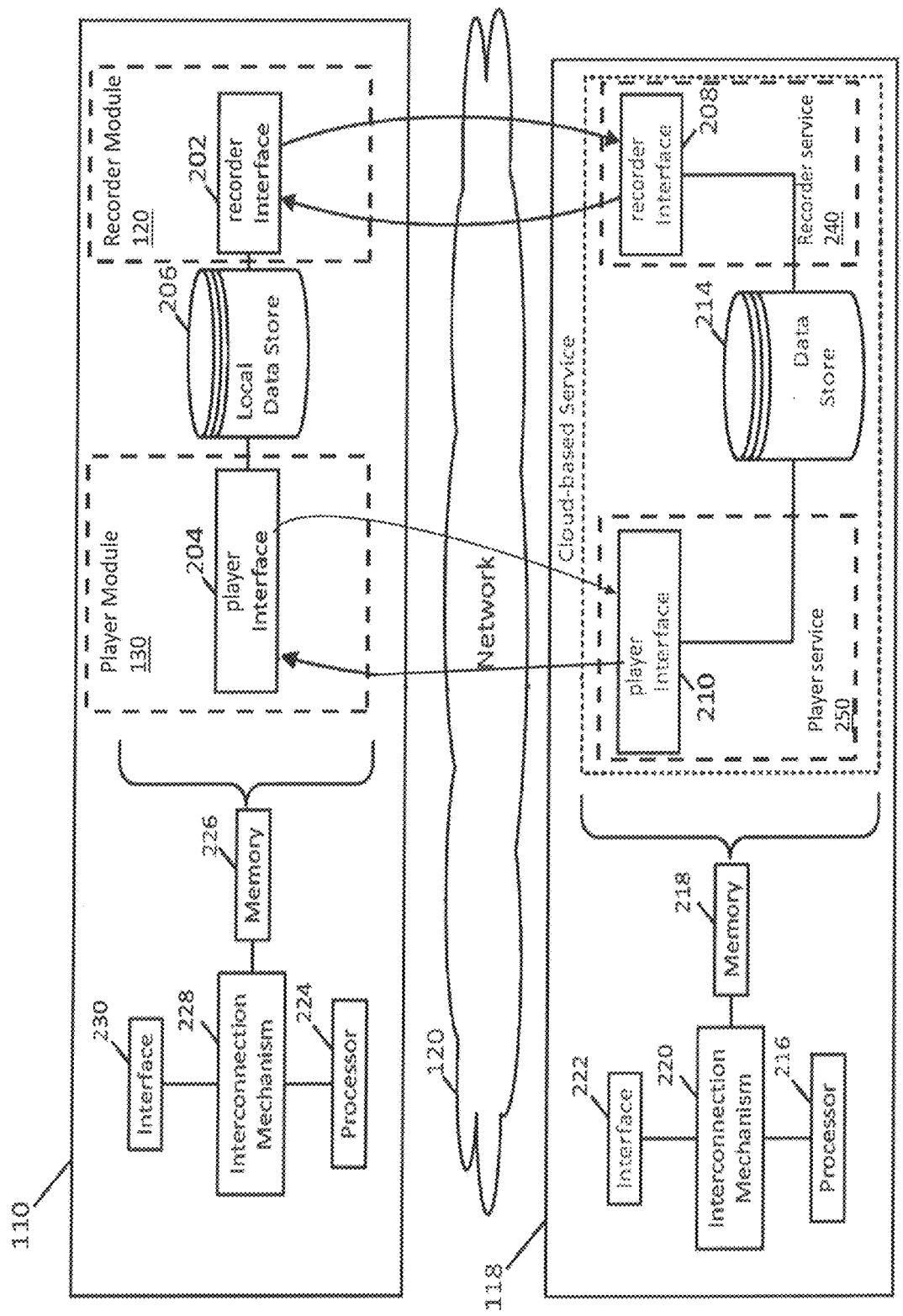
FIG. 2 is a block diagram illustrating an exemplary client device and host device of the system according to exemplary embodiment of the inventive concept.

FIG. 2 shows a more detailed view of the client device 110 and the host device 118. As shown in FIG. 2, the client device 110 includes a processor 224, a memory 226, an interconnection mechanism 228, a recorder module 120, a player module 130, and a local data store 206 (e.g., a database). The host device 118 includes a processor 216, a memory 218, an interconnection mechanism 220, an interface 222, a recorder service (e.g., a software module) 240, a player service 250 (e.g., a software module), and a data store 214 (e.g., a database). The recorder module 120 includes a recorder interface 202, the player module 130 includes a player interface, the recorder service 240 includes a recorder interface 208, and the player service 250 includes a player interface 210.

As illustrated in FIG. 2, the host device 118 and the client device 110 each include a suite of components. These components are the processors 216 and 224, the memory 218 and 226, the interconnection mechanisms 220 and 228, and the interfaces 222 and 230. Although the particular types and models of the standard components may vary between any two of the programmable devices described herein, it is appreciated that each programmable device includes a processor, memory, interconnection mechanism, and an interface as described below with reference to the host device 118.

The interface 230 includes one or more physical interface devices such as input devices, output devices, and combination input/output devices and a software stack configured to drive operation of the devices. Interface devices may receive input or provide output. More particularly, output devices (e.g., display devices, printers, etc.) may render information for external presentation. Input devices may accept information from external sources. Examples of interface devices include keyboards, mouse devices, trackballs, microphones, touch screens, printing devices, display screens, speakers, accelerometers, network interface cards, etc. Interface devices allow programmable devices to exchange information and to communicate with external entities, such as users and other systems.

The interconnection mechanism 228 is a communication coupling between the processor 224, the memory 226, and the interface 230. The interconnection mechanism 228 may include one or more physical busses in conformance with specialized or standard computing bus technologies such as IDE, SCSI, PCI, and InfiniBand. The interconnection mechanism 229 enables communications, including instructions and data, to be communicated between the processor 224, the memory 226, and the interface 230.

The memory 226 includes readable and/or writeable data storage that stores programs and data used or manipulated during operation of a programmable device. The programs stored in the memory 226 are a series of instructions that are executable by the processor 224. The memory 226 may include relatively high performance data storage, such as registers, caches, dynamic random access memory, and static memory. The memory 226 may further include a relatively low performance, non-volatile data storage medium such as flash memory or an optical or magnetic disk. Various embodiments may organize the memory 226 into particularized and, in some cases, unique structures to store data in support of the components disclosed herein. These data structures may be specifically configured to conserve storage space or increase data exchange performance and may be sized and organized to store values for particular data and types of data.

To implement specialized components of some embodiments, the processor 224 executes a series of instructions (i.e., one or more programs) that result in manipulated data. The processor 224 may be any type of processor, multiprocessor, microprocessor, or controller known in the art. The processor 224 is connected to and communicates data with the memory 226 and the interface 230 via the interconnection mechanism 228. In an embodiment, the processor 224 causes data to be read from a non-volatile (i.e., non-transitory) data storage medium in the memory 226 and written to high performance data storage. The processor 224 manipulates the data within the high performance data storage, and copies the manipulated data to the data storage medium after processing is completed.

In addition to the standard suite of components described above, both the host device 118 and the client device 110 include several customized components. For example, the host device 118 includes the recorder service 240, the player service 250, and the data store 214. In at least one embodiment, each of these customized components is implemented by the processor 216. As shown in FIG. 2, the customized components of the client device 110 include the recorder module 120, the player module 130, and the local data store 206.

In an exemplary embodiment, the recorder interface 202 of the client device 110 provides the user 102 with a graphical user interface (GUI) when the user 102 selects a graphical element from their Internet browser that was added to the browser due to the above-described plugin/extension installation. For example, the graphical element may include a dropdown menu with selectable choices having labels such as "begin recording" that begins recording upon the user 102 selecting the "begin recording" choice and "stop recording" that stops the recording upon the user 102 selecting the "stop recording" choice. While labels such as "begin recording" and "end recording" are discussed above, the labels of these choices are not limited thereto. For example, the labels can be replaced with other text or graphics. In an alternate embodiment, the GUI is presented independent of the Internet browser when the user selects an icon on a display of the client device 110 that launches the recorder module 120 as a standalone application. For example, if the user 102 wants to create a tutorial video to demonstrate how to use a paintbrush application, the user 102 could select the "begin recording" choice, select an con to start the paintbrush application, perform one or more tasks using the paintbrush application, and then select the "end recording" choice. In an alternate embodiment, the client device 110 is configured to receive voice commands from the user 102 for controlling or invoking the recorder interface 202. For example, the user 102 could speak a command such as "begin recording" to start the recording.

When the recording is begun, the recorder interface 202 performs a screen capture each time it receives one of a plurality of predefined input device events. For example, the recorder interface 202 has been pre-configured to listen to only certain predefined input device events. For example, the recorder interface 202 may run one or more event handlers or event listeners in the background. In an exemplary embodiment, the recorder interface 202 has event handlers/listeners for at least one of mouse events (e.g., a user moving the mouse, moving the mouse while a button of the mouse is selected (i.e., a drag operation), single/double clicking the left/right/middle mouse button, moving the wheel of the mouse, etc.), keyboard events (e.g., a user selecting one or more keys of a keyboard), touch screen events, and document object model (DOM) changes. For example, the mouse events may provide the event handlers/listeners with information indicating which button was pressed, how often the button was pressed (e.g., single selected/clicked, double selected/clicked, etc.), the coordinates of the mouse cursor, the position of the mouse wheel, etc.). For example, the keyboard events may provide the event handlers/listeners with event information indicating which key was pressed. For example, the touchscreen events may provide the event handlers/listeners with event information indicating coordinates of a touch and the type of touch (e.g., a single tap, a double tap, etc.). In an exemplary embodiment, the events provide additional information such as an identifier of a particular graphical element that is being interacted with. For example, if the user has left clicked the mouse on a drawing area, the event handler/listener could receive event information indicating the left mouse button was clicked, an identifier of the drawing area (e.g., a first number or a textual label such as 'drawing area'), and the location of the mouse cursor, in response to the user left clicking the mouse. In another example, if the user hit the 'p' key into a text box disposed in the drawing area, the event handler/listener could receive information indicating the 'p' key was clicked and an identifier of the text box (e.g., a second number or a textual label such as 'text box'). The event information can be used to automatically derive or infer help text. For example, first help text such as "use left mouse button to select drawing area" and second help text such as "enter p into text box" could be inferred from the above event information. The event handlers/listeners may also listen to other events such as timer events (e.g., triggered each time a certain amount of time has passed), DOM events and focus events. Event handlers/listeners may be attached to DOM elements, which represent an HTML element within a web page. A focus event may be received when a particular graphical object/element gains focus due to a user using the mouse, the keyboard, or a touch to select that graphical object/element. The focus event may provide the event handlers/listeners with the identifier of the graphical object/element.

Thus, rather than the recorder interface 202 performing a screen capture periodically (e.g., 25 times a second), the recorder interface 202 only performs screen captures in response to certain triggering events. Each screen capture results in the generation of an image file. The image file may have a portable network graphics (PNG) format, but is not limited thereto.

Figure 3:
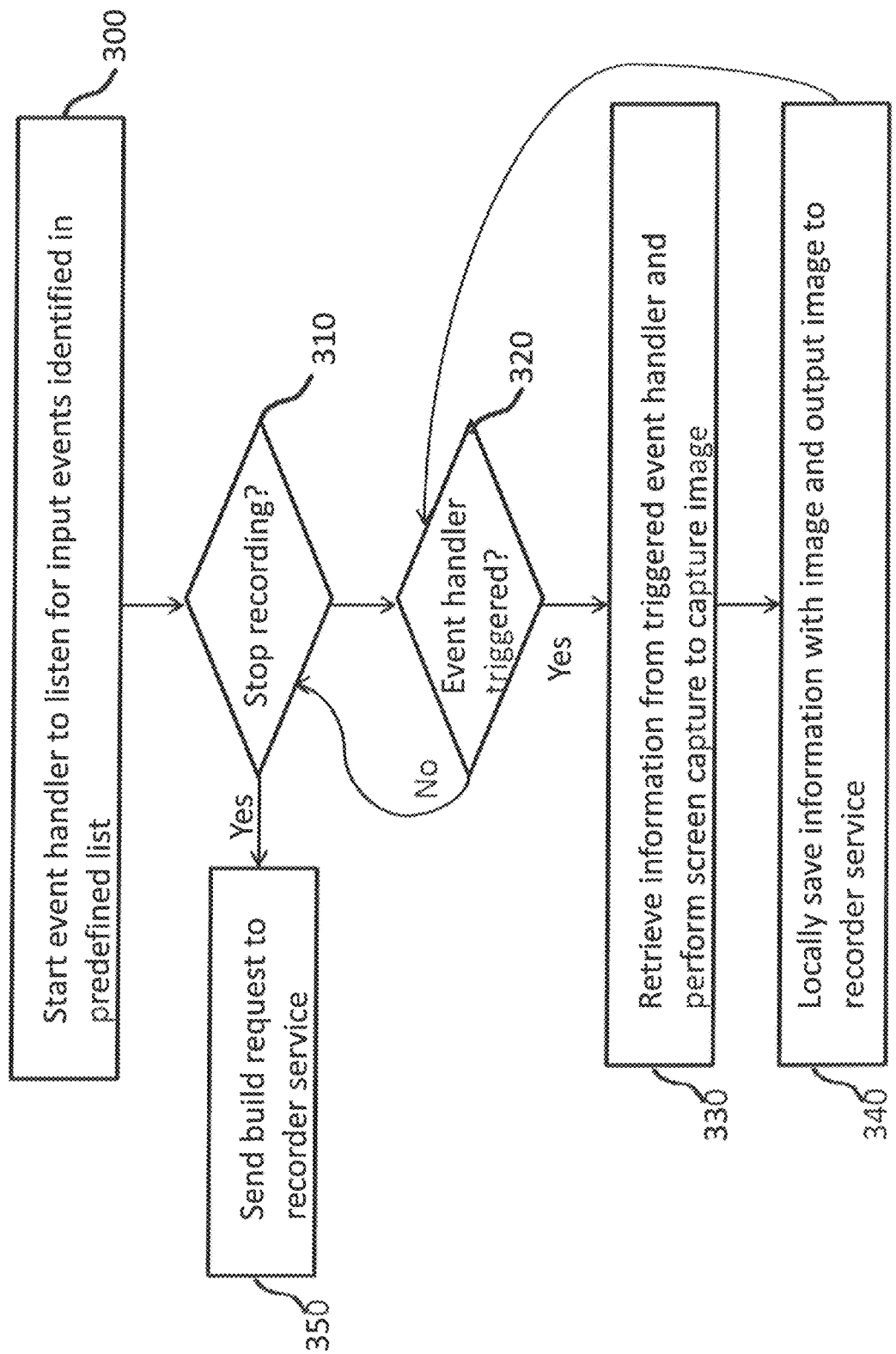
FIG. 3 illustrates a method for recording information and images to be used to generate the image variations according to an exemplary embodiment of the inventive concept.

FIG. 3 illustrates a method of operating a process of the recorder interface 202, which is performed by the client device 110 shown in FIG. 1A and FIG. 2. The method includes starting an event handler (or an event listener) to listen for input events identified in a pre-defined list (step 300). An event handler is a software routine that processes actions such as keystrokes and mouse movements. For example, the event handler can call a function in response to the occurrence of a focus event, where the focus event occurs each time a graphical element of a graphical user interface gains focus due to a user 102 using the mouse to select the graphical element. In another example, the event handler calls a function in response to the occurrence of keyboard event, where the keyboard event occurs each time a key of the keyboard is pressed.

The method of FIG. 3 further includes determining whether to stop the recording (step 310). For example, the recording can be stopped if the user selects a certain choice (e.g., 'stop recording') on a graphical user interface of the recorder interface 202 or after a predetermined amount of time has elapsed.

Assuming the recording has not been stopped, the method of FIG. 3 checks whether the event handler has been triggered (step 320). For example, if an event (e.g., a mouse click, a keyboard click, a gain of focus) being monitored by the event handler, occurs, the method proceeds to step S330. If the event handler was not triggered during the check, the method of FIG. 3 can proceed back to step S310.

In step S330, the method of FIG. 3 retrieves information from the triggered event handler and performs a screen capture to capture an image. For example, the triggering of the event handler may call a first function with a pointer to an event data structure that includes a plurality of event items. The pointer can then be used to retrieve the event items. For example, one of the event items could be an identifier of a graphical element that was selected, a coordinate of a cursor of the mouse, a character of a key that was pressed, etc. Further, the first function could call a second function using the identifier as a parameter to query for the name of or a label of the graphical element. For example, if the user 102 used a mouse to select a shape button of a paintbrush application, the label returned could be 'shape'. The screen capture may be performed by calling a screen capture program of an operating system of the client device 110. The screen capture program may be run in the background relative to the recorder interface 202. For example, the first function could pass a parameter to the screen capture program indicating the name of the image file to create.

The method of FIG. 3 next includes locally saving the retrieved information with the image and outputting the image to the recorder service 240 (step 340) of the host device 118. For example, the first function could insert an entry into the local data store 206 indicating a name of the recording (e.g., 'tutorial1'), having sub-entries indicating the name of the image file (e.g., img1.png) and a location (e.g., filepath) of the image file (e.g., /recordings) and help text (e.g., 'shapes'). The sub-entries may additionally include a timestamp or an order number so that the image files can be ordered within the recording. The recorder interface 202 outputs the image (e.g., img.png) across the network 120 to the recorder service 240 of the host device 118.

The method of FIG. 3 then returns to step 320 to determine whether another event handler of the list has been triggered. Thus, steps 320-340 may be performed numerous times before a stop recording is encountered. When the stop of the recording is encountered, the method of FIG. 3 sends a build request to the recorder service 240 (step 350) of the host device 118. For example, the recorder interface 202 formats a message using data stored in the local data store 206 for the last recording and outputs the message as the build request across the network 120 to the recorder service 240 of the host device 118.

Figure 4:
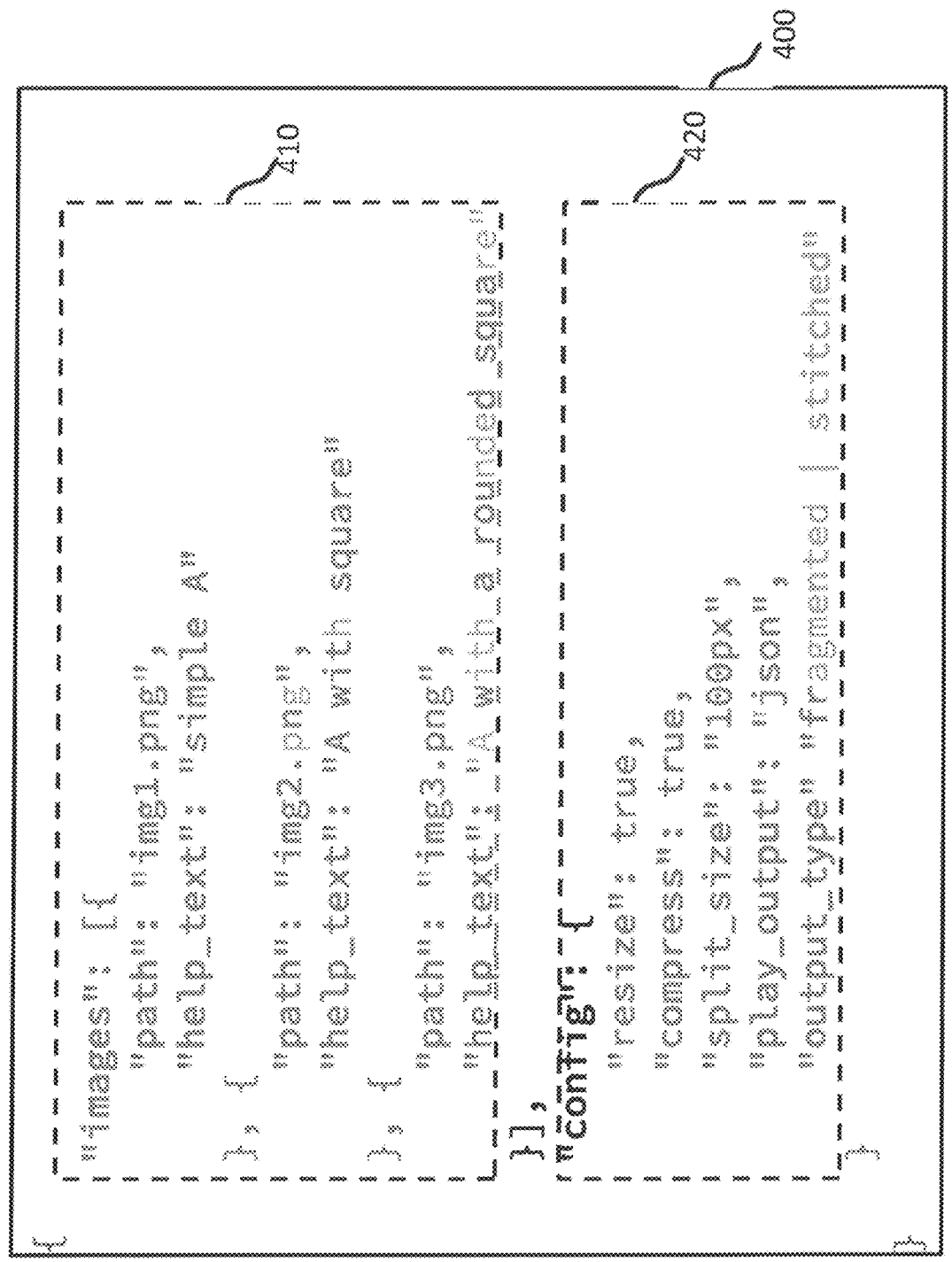
FIG. 4 illustrates an example of the information in a JavaScript Object Notation (JSON) format.

FIG. 4 illustrates an example of a build request that can be sent to the recorder service 240 of the host device 118. In the example shown in FIG. 4, the build request has a JavaScript Object Notation (JSON) format, but the inventive concept is not limited thereto. As shown in FIG. 4, the build request includes first data 410 identifying the images captured and corresponding help text derived from the input device events that triggered the capture of the corresponding images, and second data 420 including one or more information parameters. The order in which the captured images are to be played can be inferred from the order in which the images are listed in the first data 410 or from their names (e.g., img2 is played between img1 and img3 since 2 is between 1 and 3). The first data 410 may include keywords (e.g., 'path', 'help_text') that can be searched for by the recorder service 240 to determine the identities of the images that are to be played and the help text that is to be presented along with the corresponding image. For example, the information parameters may include at least one of a first parameter indicating whether the images are to be resized, a second parameter indicating whether the images are to be compressed, a third parameter indicating the size (e.g., 100×100 pixels) of image fragments the images are to be divided into, a fourth parameter indicating the format of the play file (e.g., JSON), and a fifth parameter indicating whether to operate in a fragmented mode or a stitched mode.

The recorder service 240 of the host device 118 stores the images it receives from the recorder module 120 of the client device 110 into the data store 214. The recorder service 240 may create an index in response to a recording session started by the recorder interface 202 that identifies where the received images are stored in the data store 214, and store the index in the data store 214. The receipt of a first image from the recorder module 120 may cause the recorder service 240 to create the index, and then the receipt of the build request may inform the recorder module 120 that a new index is to be created when a next image is received. The recorder service 240 generates a play file from the received build request and the images stored in the data store 214.

Figure 5:
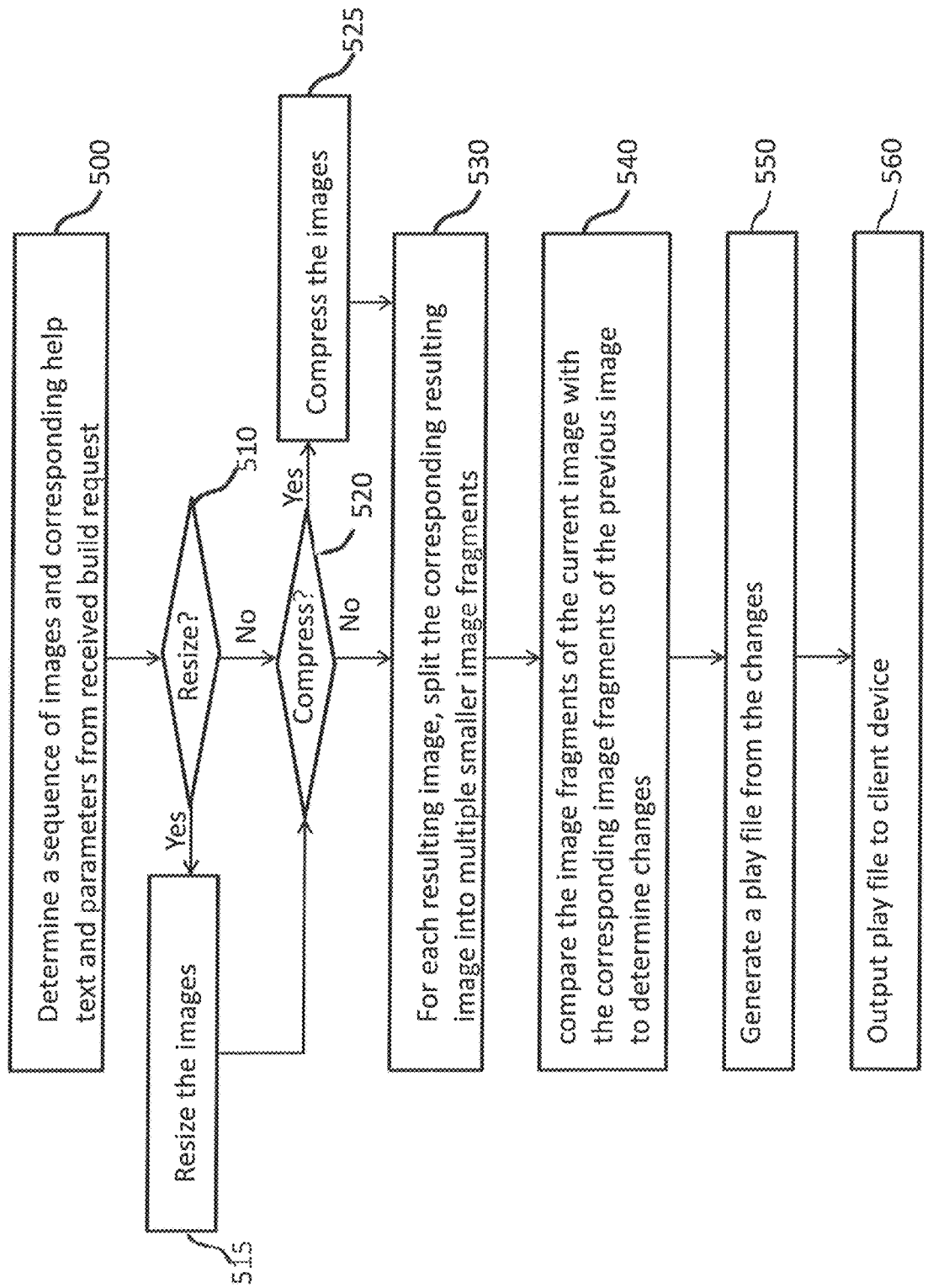
FIG. 5 illustrates a method for processing the information and the images to generate a play file according to an exemplary embodiment of the inventive concept.

FIG. 5 illustrates a method of processing a build request for generating a play according to an exemplary embodiment of the inventive concept. The build request is received from the client device 110 and the method of FIG. 5 is performed by the host device 118. The method of FIG. 5 includes determining a sequence of images and corresponding help text and parameters from a build request (step 500). While FIG. 4 shows a build request where each referenced image includes corresponding help text, the help text may be omitted for one or all of the referenced images. Further, while FIG. 4 shows a build request including several of the parameters, one or all of the parameters may be omitted. Thus, step 500 may be replaced with a step of determining the sequence of images from the build request and determining the parameters from a configuration file pre-installed on the host device 118. In an alternate embodiment, the configuration file is omitted and the recorder service 240 uses default values for the parameters. Based on the build request of FIG. 4, the sequence of images files and corresponding help text would be ({"img1.png", "simple A"}; {"img2.png", "A with square"}, {"img3.png", "A with a rounded square"}). For example, the determined parameters may indicate whether to resize the images, whether to compress the images, the format type of the play file, or whether to stitch the image fragments.

The method of FIG. 5 further includes determining whether to resize the images (step 510), which is optional. For example, in an alternate embodiment, no check is performed to determine whether a resize parameter is present or the resize parameter is ignored. When the check is performed, the resize parameter is present, and the resize parameter indicates that a resize is to be performed, the method of FIG. 5 resizes each of the images (step 515). The resizing may either increase or decrease the resolution of the images. For example, if the images have a resolution of 900×900 pixels, a resize could result in each of the images having a resolution of 300×300 pixels. In an exemplary embodiment, the original images are not overwritten or deleted. However, in alternate embodiment, the original images are rewritten or deleted to save on memory space of the host device 118.

The method of FIG. 5 further includes determining whether to compress the images (step 520), which is optional. For example, in an alternate embodiment, no check is performed to determine whether a compress parameter is present or the compress parameter is ignored. When the check is performed, the compress parameter is present, and the compress parameter indicates that a compression is to be performed, the method of FIG. 5 compresses each of the images (step 525). The compression may be performed in a lossless fashion or a lossy fashion. For example, an image file in a png format could be compressed to a joint photographic experts group (JPEG) format.

The method of FIG. 5 further includes, for each of the resulting images (e.g., compressed and resized, resized, compressed, or original) splitting the corresponding result image into multiple smaller image fragments (step 530). The splitting may be performed based on the above-described third parameter that indicates the size of the image fragments or may be based on a default value.

Figure 6:
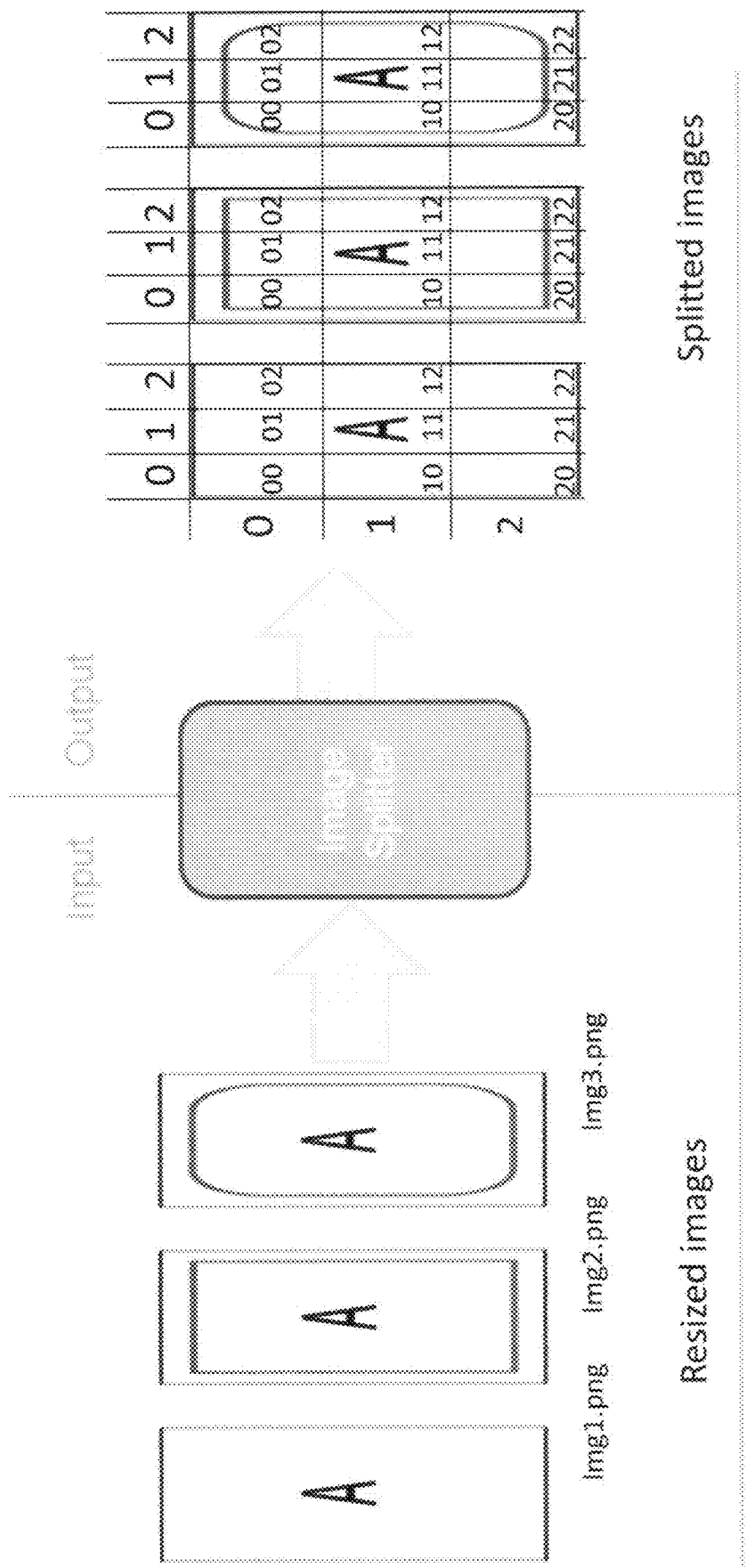
FIG. 6 illustrates an example of interim data that may be generated as a result of performing one or more steps of FIG. 5.

FIG. 6 shows an example, where the splitting of 3 images of size 300×300 pixels resulted in 3 fragmented images, where each fragmented image includes 9 fragments, and each fragment has a size of 100×100 pixels. The values shown on the x-axis and the y-axis in FIG. 6 may be used to reference particular image fragments. For example, resized image Img1.png is divided (split) into image fragment Img1_0_0.png, Img1_0_1.png, Img1_0_2.png, Img1_1_0.png, Img1_1_1.png, Img1_1_2.png, Img1_2_0.png, Img1_2_1.png, and Img1_2_2.png, resized image Img2.png is divided into image fragment Img2_0_0.png, Img2_0_1.png, Img2_0_2.png, Img2_1_0.png, Img2_1_1.png, Img2_1_2.png, Img2_2_0.png, Img2_2_1.png, and Img2_2_2.png, and resized image Img3.png is divided into image fragment Img3_0_0.png, Img3_0_1.png, Img3_0_2.png, Img3_1_0.png, Img3_1_1.png, Img3_1_2.png, Img3_2_0.png, Img3_2_1.png, and Img3_2_2.png. In an exemplary embodiment, the image fragments (i.e., the splitted images) are stored in the data store 214.

The method of FIG. 5 further includes, for each current one of the resulting images, comparing image fragments of the current image with the corresponding image fragments of the previous image to determine changes (step 540).

Figure 7:
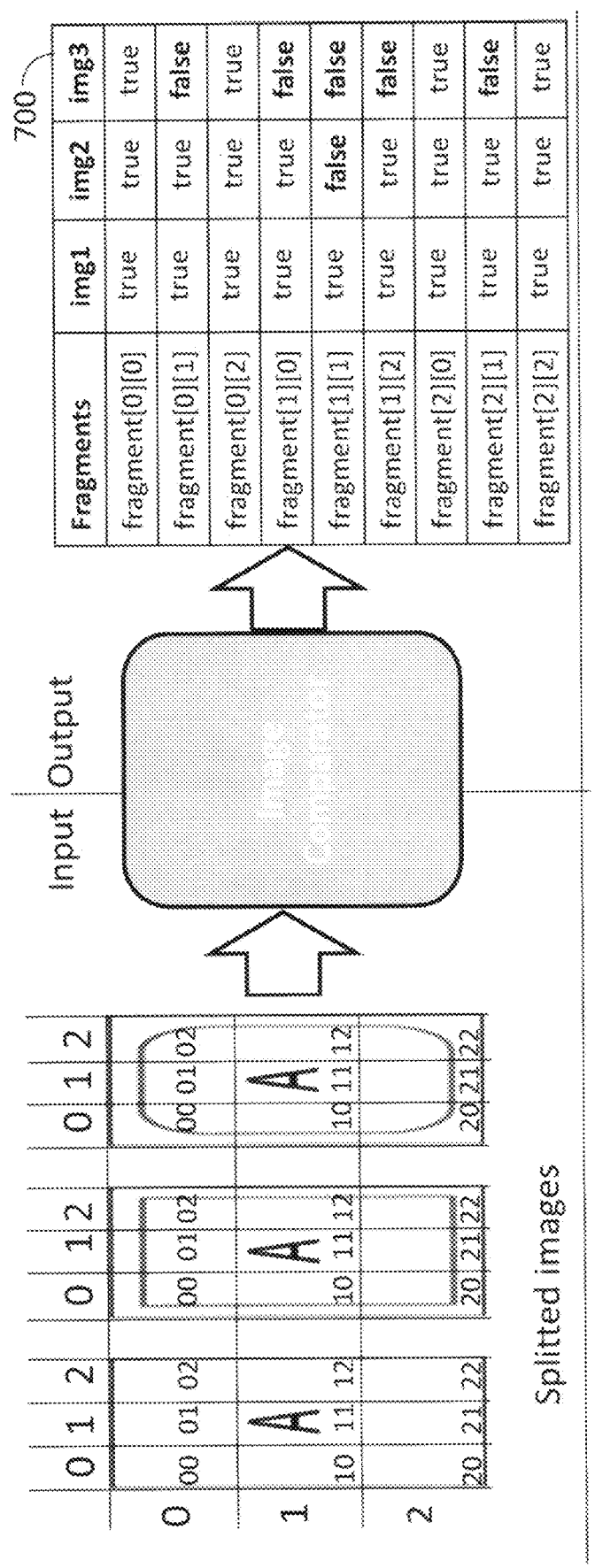
FIG. 7 illustrates another example of interim data that may be generated as a result of performing one or more steps of FIG. 5.

FIG. 7 shows an example of the splitted images (i.e., the image fragments) from different images being compared to generate a table 700 representing the changes. In FIG. 7, the comparison is performed on a current image and a prior image in the sequence. For example, the first column of table 700 indicates all the image fragments have changed (all fragments in column 1 set to true) because there is no image that is prior to the first image (e.g., Img1.png). Thus, all the image fragments of the first image Img1 are retained for the first frame. The second column of table 700 indicates that all the image fragments except for fragment[1][1] have changed in a comparison between the first image and the second image Img2 (e.g., Img2.png). For example, as shown in FIG. 7, all of the image fragments among the first and second images have transitioned from not having a part of a box to having a part of the box, except fragment[1][1]. Thus, one image fragment fragment[1][1] (this fragment is set to false in column 2) of the second image can be discarded and the remaining 8 changed fragments (these fragments set to true in column 2) of the second image Img2 are retained for the second frame. The third column of table 700 indicates that only 4 fragments[0][0], [0][2], [2][0], and [2][2] (these fragments are set to true in column 3) have changed in a comparison of the second image and the third images (e.g., Img3.png). For example, as shown in FIG. 7, the corner image fragments have changed from square corners to rounded corners, while the remaining image fragments have the same previous straight portions. Thus, 5 image fragments fragment[0][1], [1][0], [1][1], [1][2], and [2][1] (these fragments are set to false in column 3) can be discarded and the remaining 4 changed image fragments [0][0], [0][2], [2][0], and [2][2] are retained for the third frame.

In an exemplary embodiment, only the retained fragments are stored in the data store 214 during the fragmented mode of operation. In exemplary embodiment, the retained fragments for each frame are stitched together to form a single stitched image of that frame and only the stitched images are stored in the data store 214, during a stitched mode of operation. When there are only 3 frames as in the above example, there would only be three resulting stitched images to save. In an exemplary embodiment, the build request indicates whether to operate in the stitched mode or the fragmented mode. Alternately, the recorder service 240 can always operate in one of the modes (e.g., stitched) as a default.

The method of FIG. 5 further includes generating a play file from the changes (step 550). In an exemplary embodiment, the size in memory space of the play file and the stitched images is less than 25% of a size of the captured sequence of screenshots. For example, the play file can be generated from the table 700 shown in FIG. 7, the names of the image fragment files, and the help text in the build request. In an exemplary embodiment, the play file has a JSON format. Further, the content in the play file may vary based on the mode of operation. The method further includes outputting the play file to the client device 110 (step 560). For example, the recorder interface 240 can output the play file across the network 120 to the recorder interface 120, and the recorder interface 120 can store the play file in the data store 206.

FIG. 8 illustrates one example of the play file that can be generated from table 700 when the mode of operation is fragmented. As shown in FIG. 8, the play file 800 includes first data 810 identifying the frames of image data to play and the image fragments within each frame, second data 820 including play file parameters, and third data 830 including help text. The first data 810 may include keywords (e.g., "frames", "frames_1", "frames_2", . . . , "frames_n", etc.) and delimiters (e.g., '{', '}', '[', ']', etc.) so that the player module 120 can parse the first data 810 to determine the order of the frames to present and the image fragments within each frame to present. The first data 810 may include the filename of each of the image fragments (e.g., "img_1_0_0.png") and the location of each image fragment (e.g., a file path). The play file parameters of the second data 820 may include parameters indicating at least one of the size of each image fragment, the number of rows and columns the image fragments are to be arranged within, the location to place the help text on a display, an amount of a time to delay between presenting frames, the number of frames, and a type (e.g., fragmented). The third data 830 includes help text for each of the frames that are to be presented along with the corresponding frame. For example, FIG. 8 shows that the help text "Simple A" is presented on a display while the first frame ("frame_0") is also being presented to instruct the user 102 that the first frame pertains to drawing of the letter 'A' as shown in FIG. 5 and FIG. 6. The second data 820 and the third data 830 are optional (i.e., may be omitted.). The data within the play file 800 may be referred to as metadata.

The player module 130 can be invoked by the user 102 to playback the previous recording. For example, if the player module 130 was installed to an Internet browser of the client device 110, the user 102 can select a dropdown menu from the browser created during the installation, and select a choice ("playback") of the dropdown menu to display a graphical user interface ("GUI") for playing back the previous recording.

The playback GUI may be managed by the player interface 204. For example, the playback GUI may include a list with a selectable item labeled with a filename of the play file (e.g., "tutorial1"), where selection of the item executes a playback process to begin the playback. For example, the player interface 204 may execute the playback process.

Figure 9:
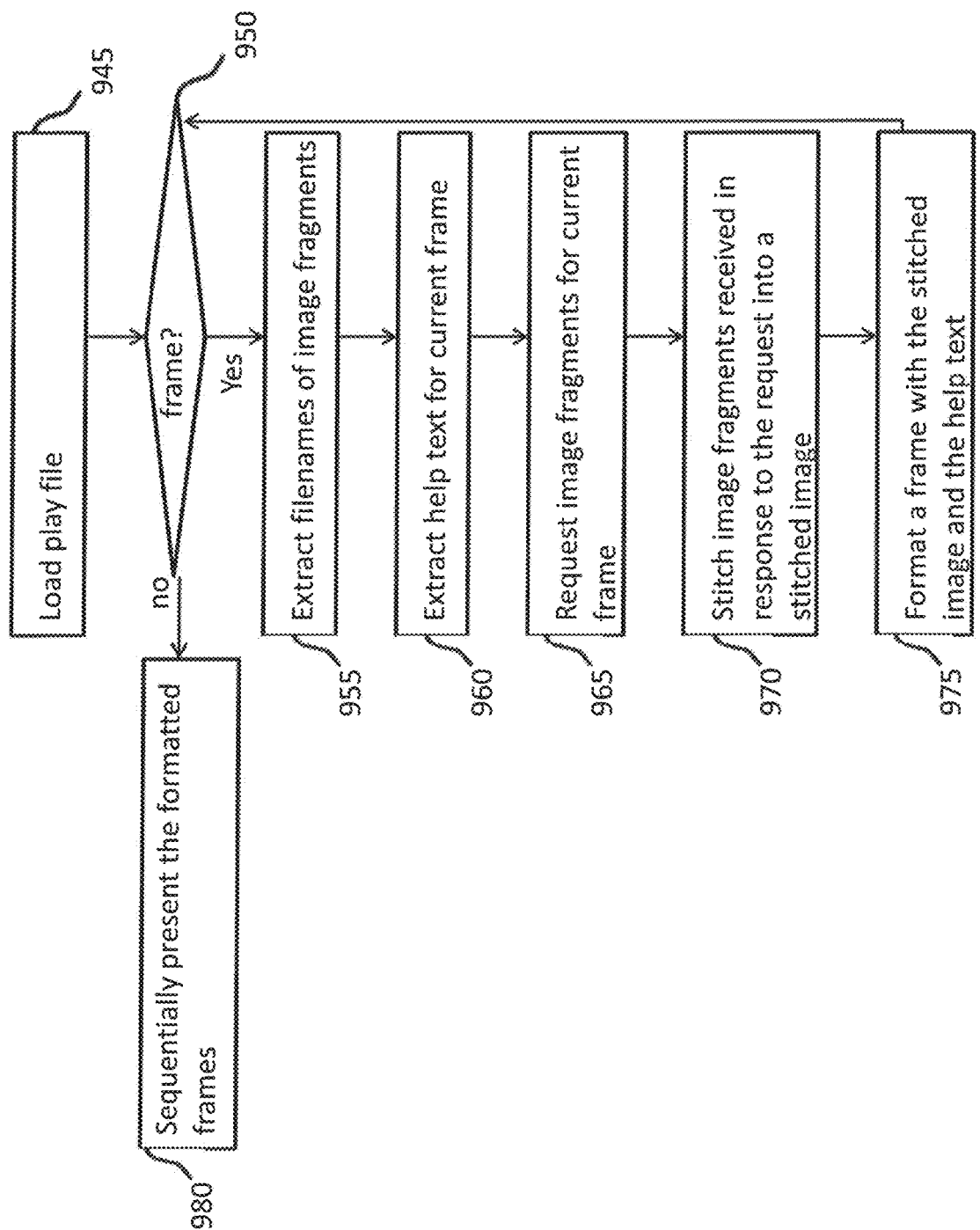
FIG. 9 illustrates a method of processing the play file of FIG. 8 to generate and play image variations according to an exemplary embodiment of the inventive concept.

FIG. 9 illustrates the playback process according to an exemplary embodiment of the inventive concept when the play file is created during a fragmented mode of operation.

The method of FIG. 9 includes loading the play file (step 945). For example, the player interface 204 of the client device 110 can load the play file from the data store 206 by performing an operating system open command on a filename of the play file to return a file pointer and perform one or more operating system read commands using the file pointer to load text of the file into an array in memory.

The method of FIG. 9 further includes advancing to a current frame (step 950). For example, as shown in FIG. 8, when the play file is first opened, the method would first advance to the first frame (e.g., "frame_0").

The method of FIG. 9 next includes extracting filenames of image fragments of the current frame (step 955). For example, as shown in FIG. 8, extracting the filenames for the first frame would result in filenames of "img1_0_0.png", "img1_0_1.png", "img1_0_2.png", "img1_1_0.png", "img1_1_1.png", "img1_1_2.png", "img1_2_0.png", "img1_2_1.png", and "img1_2_2.png".

The method of FIG. 9 next includes extracting the help text for the current frame (step 960). For example, as shown in FIG. 8, extracting the help text for the first frame would result in help text of "Simple A".

The method of FIG. 9 next includes requesting image fragments for the current frame (step 965). The requesting may be performed based on the extracted filenames. For example, the player interface 204 of the client device 110 can send a request across the network 120 to the player service 250 that includes the filenames, and the player interface 210 of the host device 118 can respond to the request by sending image fragments to the player module 130 having those filenames.

The method of FIG. 9 next includes stitching the image fragments received in response to the request into a stitched image (step 970). In an exemplary embodiment, the filenames of the image fragments indicate coordinates within the stitched image to insert the fragment. For example, when a stitched image includes 3×3 tiles, the image fragment img1_0_0.png would be placed into the tile in the $0^{th}$ row and $0^{th}$ column, the image fragment img1_0_1.png would be placed into the tile in the $0^{th}$ row and $1^{st}$ column, the image fragment img1_0_2.png would be placed into the tile in the $0^{th}$ row and $2^{nd}$ column, etc. In an exemplary embodiment, any tile of the stitched image that does not receive an image fragment is transparent so that when it is presented over a prior stitched image during playback, the prior corresponding tile is visible.

The method of FIG. 9 next includes formatting a frame with the stitched image and the help text (step 975). For example, the formatting may include overlapping or overlaying the stitched image with the help text.

The method of FIG. 9 then returns to step 950 and repeats until all frames of the play file have been processed. Once all the frames have been processed, the method sequentially presents the formatted frames on a display (step 980). The formatted frames may be presented with some delay therebetween to simulate a video and to enable a user 102 to perceive each of the frames and their corresponding help text.

FIG. 10 illustrates another example of the play file that can be generated from table 700 when the mode of operation is stitched. As shown in FIG. 10, the play file 1000 includes first data 1010 identifying the frames of image data to play and the stitched image within each frame, second data 1020 including play file parameters, and third data 1030 including help text. The first data 1010 may include the filename of each of the stitched images (e.g., "stitched_0.png") and the location of each stitched image (e.g., a file path). The play file parameters of the second data 1020 may include parameters indicating the number of rows and columns of the stitched image, the location to place the help text on a display, an amount of a time to delay between presenting frames, the number of frames, and a type (e.g., stitched). The third data 1030 includes help text for each of the frames that are to be presented along with the corresponding frame. The second data 1020 and the third data 1030 are optional (i.e., may be omitted.). The data within the play file 1000 may be referred to as metadata.

Figure 11:
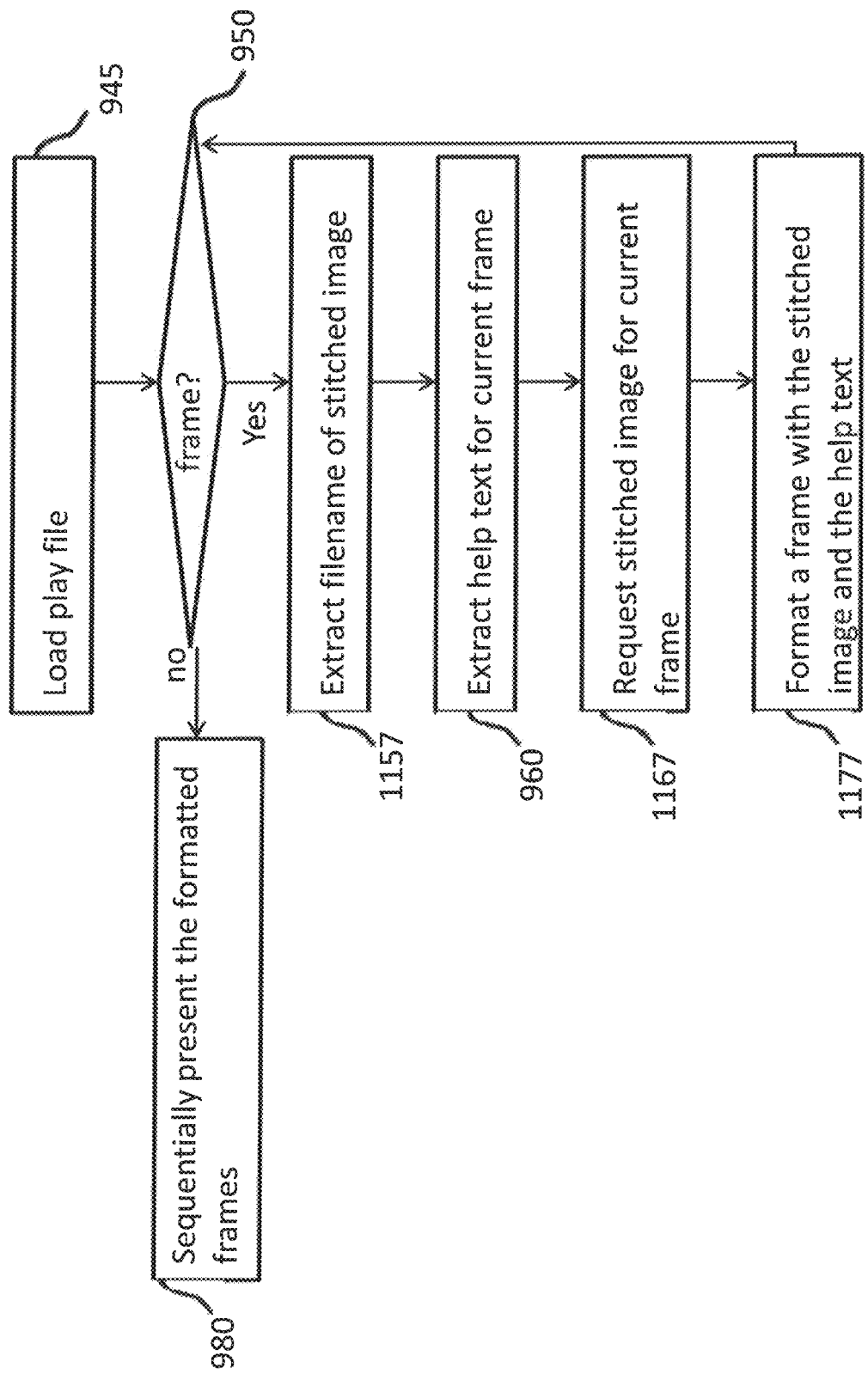
FIG. 11 illustrates a method of processing the play file of FIG. 10 to generate and play image variations according to an exemplary embodiment of the inventive concept.

FIG. 11 illustrates the playback process according to an exemplary embodiment of the inventive concept when the play file is created during a stitched mode. The process of FIG. 11 is similar to that of FIG. 9. For example, the process of FIG. 11 includes steps 945, 950, 960, and 980 of FIG. 9. However, different from the process of FIG. 9, the process of FIG. 11 extracts a filename of a stitched image from the play file (step 1157), requests the stitched image for the current frame (step 1167), and formats a frame with the stitched image and the help text (step 1177). For example, as shown in FIG. 10 and FIG. 2, the extracted filename of the stitched image of the first frame is "stitched_0.png", the player interface 204 of the client device 110 sends a request to the player service 250 for the stitched image using the extracted filename, and a first frame is formatted with a stitched image received in response to the request and the help text in the third data 1030 associated with the first frame.

Figure 12:
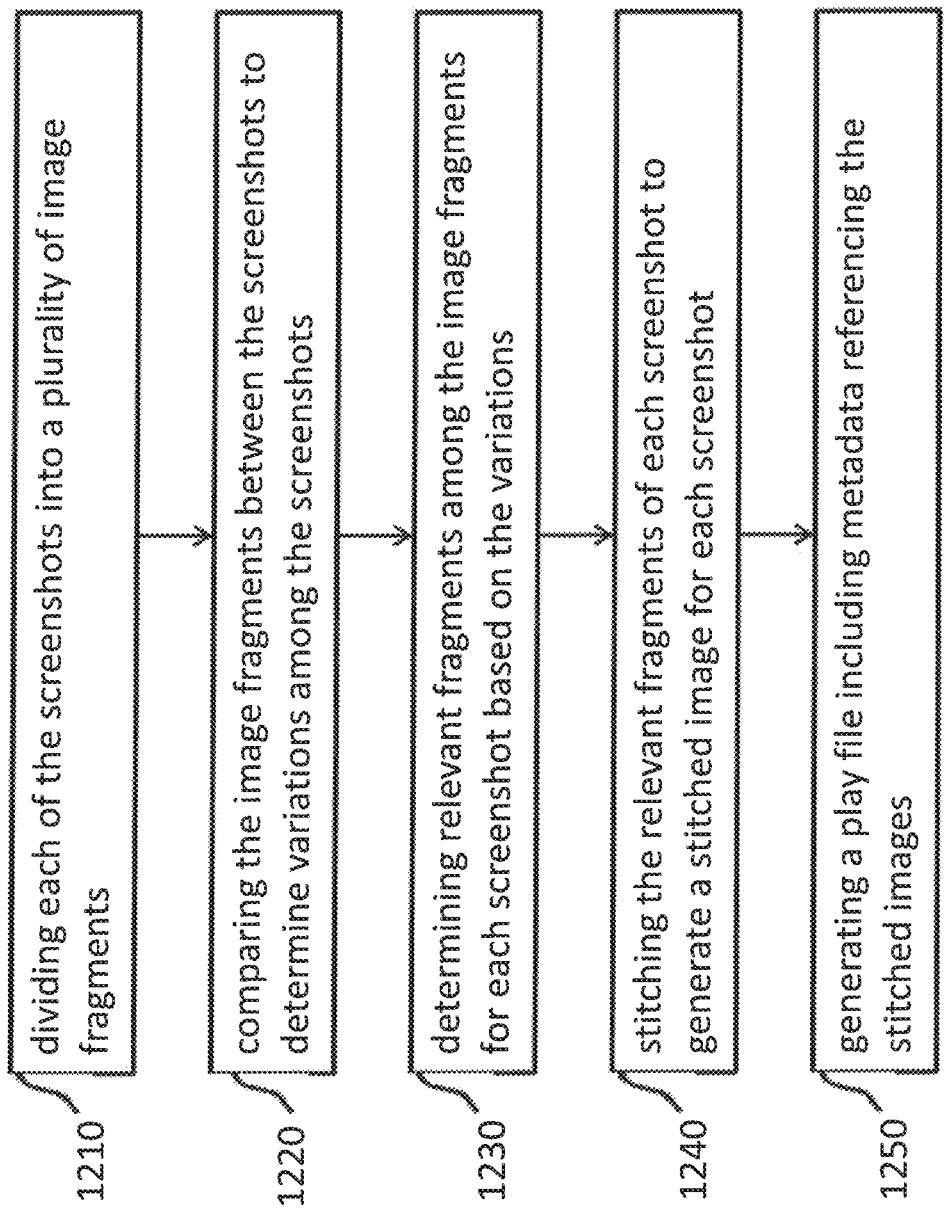
FIG. 12 illustrates a method of generating a play file according to an exemplary embodiment of the inventive concept.

FIG. 12 illustrates a method of generating a play file according to an exemplary embodiment of the inventive concept. The method of FIG. 12 is performed by the host device 118. For example, the method of FIG. 12 may be performed by the recorder service 240 of the host device 118 shown in FIG. 2. According to this embodiment, the host device 118 previously received a sequence of screen captures from the client device 110 (e.g., from the recorder module 120 of FIG. 2) during a recording session, and the method of FIG. 12 is being executed in response to receipt of a build request from the client device 110 after the user 102 has stopped the recording.

The method of FIG. 12 includes dividing each of the screenshots into a plurality of image fragments (step 1210). For example, each screenshot is divided into at least two image fragments.

The method of FIG. 12 further includes comparing the image fragments between the screenshots to determine variations among the screenshots (step 1220). For example, if each screenshot is divided into 2 fragments, and there are only two screenshots, then the first fragment of the first screen shot is compared to the first fragment of the second screenshot, and the second fragment of the first screenshot is compared to the second fragment of the second screenshot. Two fragments may be considered the same as one another (i.e., unchanged) when greater than a certain number of pixels of the fragments have a same color or intensity or all the pixels have the same color or intensity, and otherwise the two fragments may be considered different from one another (i.e., changed). Further, all the image fragments of the first frame may be considered changed since there is no prior frame to compare them against.

The method of FIG. 12 further includes determining relevant fragments among the image fragments for each screenshot based on the variations (step 1230). In an exemplary embodiment, the relevant fragments are the ones that have changed. For example, if there are only two screenshots each with two fragments, and the second screenshot is identical to the first screenshot, both fragments of the first screenshot are relevant because they are part of the first screenshot, and none of the fragments of the second screenshot are relevant since they match those of the first screenshot.

The method of FIG. 12 further includes stitching the relevant fragments of each screenshot to generate a stitched image for each screenshot (step 1240). For example, if a screenshot is divided into 9 image fragments and the center fragment is not relevant, the remaining 8 fragments are stitched together along with a transparent center fragment to form a current stitched image that can be later overlaid with a prior stitched image. The remaining 8 fragments of the current stitched image would overwrite the corresponding 8 fragments of the prior stitched image and the center fragment of the prior stitched image would not be overwritten due to the transparent center fragment of the current stitched image.

The method of FIG. 12 then includes generating a play file including metadata referencing the stitched images (step 1250). For example, FIGS. 8 and 10 are examples of the play file that could be created, where data 810-830 and 1010-1030 are examples of the metadata.

Once the play file of FIG. 12 is generated, the host device 118 can make the play file accessible to the client device 110. For example, the host device 118 outputs the play file to the client device 110 so the client device 110 can sequentially present the stitched images referenced by the play file on a display device of the client device 110 to simulate playback of the video. For example, the client device 110 overlays the stitched image with text of the play file associated with the stitched image, and repeats this with respect to each of the stitched images.

In an alternate embodiment, instead of generating the play file referencing the stitched images, the host device 118 generates a video from a sequence of the stitched images. For example, each frame of the video is a next one of the stitched images of the sequence. The video is in a format (e.g., a MPEG, MOV, an AVI, etc) that can be played by a conventional media player. Each frame of the video may be overlaid with text received in the build request from the client device 110. For example, if a stitched image is stitched from image fragments of a screen capture associated with help text in the build request, then the stitched image would be overlaid with the help text in a corresponding frame of the video. For example, the resulting video can be sent to the client device 110 so that a media player of the client device 110 can be used to play the video.

Figure 13:
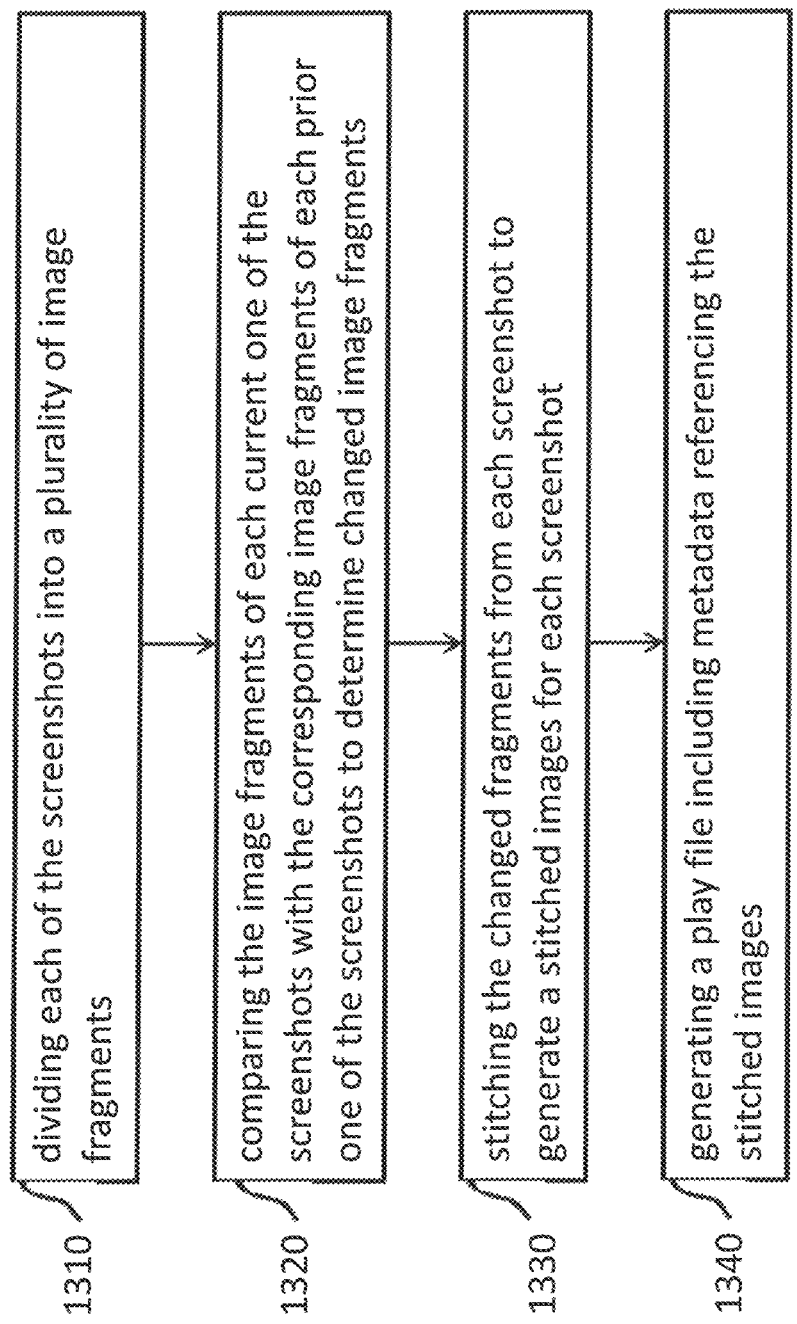
FIG. 13 illustrates a method of generating a play file according to another exemplary embodiment of the inventive concept.

FIG. 13 illustrates a method of generating a play file according to another exemplary embodiment of the inventive concept. The method of FIG. 13 is performed by the host device 118. For example, the method of FIG. 13 may be performed by the recorder service 240 of the host device 118 shown in FIG. 2. According to the present embodiment, the host device 118 previously received a sequence of screen captures from the client device 110 (e.g., from the recorder module 120 of FIG. 2) during a recording session, and the method of FIG. 13 is being executed in response to receipt of a build request from the client device 110 after the user 102 has stopped the recording.

The method of FIG. 13 includes dividing each of the screenshots into a plurality of image fragments (step 1310). For example, each screenshot is divided into at least two image fragments.

The method of FIG. 13 further includes comparing the image fragments of each current one of the screenshots with the corresponding image fragments of each prior one of the screenshots to determine changed image fragments (step 1320). For example, if each screenshot is divided into 2 fragments, and there are only two screenshots, then the first fragment of the first screenshot is compared to the first fragment of the second screenshot, and the second fragment of the first screenshot is compared to the second fragment of the second screenshot.

The method of FIG. 13 further includes stitching the changed fragments of each screenshot to generate a stitched image for each screenshot (step 1330). For example, if a screenshot is divided into 9 image fragments and the center fragment is not relevant, the remaining 8 fragments are stitched together along with a transparent center fragment to form a current stitched image that can be later overlaid with a prior stitched image.

The method of FIG. 13 then includes generating a play file including metadata referencing the stitched images (step 1340). For example, FIGS. 8 and 10 are examples of the play file that could be created, where data 810-830 and 1010-1030 are examples of the metadata.

Once the play file of FIG. 13 is generated, the host device 118 can make the play file accessible to the client device 110. For example, the host device 118 outputs the play file to the client device 110 so the client device 110 can sequentially present the stitched images referenced by the play file on a display device of the client device 110 to play a video that simulates the video recorded by the user. For example, the player of the client device 110 can overlay the stitched image with text of the play file associated with the stitched image, and repeat this with respect to each of the stitched images. For example, the play file may include metadata identifying a sequence of frames, identifying a stitched image file (e.g., by filename) to be presented for each of the frames, and including text to be overlaid with each of the stitched images. The metadata may further include a time delay amount (e.g., 1 second) that is used to delay presentation of a subsequent frame to ensure the user 102 has sufficient time to perceive each frame and its corresponding text. The metadata may also include position information so the text can be overlaid with a corresponding stitched image at a position based on the position information. For example, the player of the client device 110 (e.g., player module 130) can then parse the play file to extract a sequence of the filenames of the stitched images, extract text for each filename in the sequence, extract the time delay amount, and extract the position. Then, the player can use the filenames to retrieve a corresponding sequence of stitched image files from the host device 118, overlay the extracted text at the position with each of the corresponding stitched image files to generate a sequence of overlaid image files, and sequentially present the overlaid image files on a display device of the client device 110 with a delay therebetween based on the extracted time delay amount.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. For example, the player service 250, data store 214, and recorder service 240 may be located in the cloud or provided by a cloud-based service. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 14:
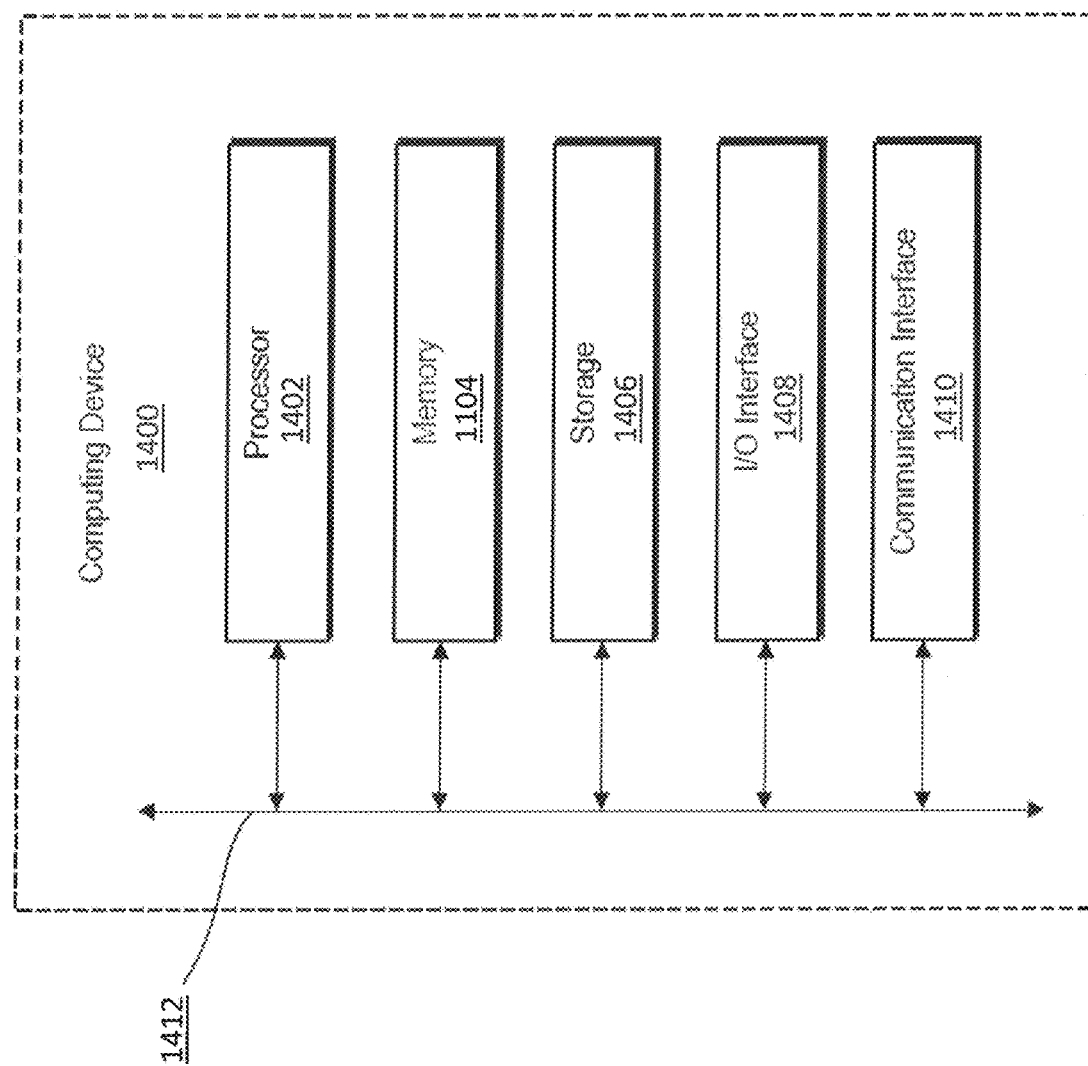
FIG. 14 illustrates an exemplary computing device that may be used to perform one or more methods of the disclosure.

FIG. 14 illustrates a block diagram of an example computing device 1400 that may be configured to perform one or more of the processes described above. One will appreciate that one or more computing devices, such as the computing device 1400 may represent the computing devices described above (e.g., the client device 110 or the host device 118). In one or more embodiments, the computing device 1400 may be a mobile device (e.g., a mobile telephone, a smartphone, a PDA, a tablet, a laptop, a camera, a tracker, a watch, a wearable device, etc.). In some embodiments, the computing device 1400 may be a non-mobile device (e.g., a desktop computer or another type of client device 110). Further, the computing device 1400 may be a server device that includes cloud-based processing and storage capabilities.

As shown in FIG. 14, the computing device 1400 can include one or more processor(s) 1402, memory 1404, a storage device 1406, input/output interfaces 1408 (or "I/O interfaces 1408"), and a communication interface 1410, which may be communicatively coupled by way of a communication infrastructure (e.g., bus 1412). While the computing device 1400 is shown in FIG. 14, the components illustrated in FIG. 14 are not intended to be limiting. Additional or alternative components may be used in other embodiments. Furthermore, in certain embodiments, the computing device 1400 includes fewer components than those shown in FIG. 14. Components of the computing device 1400 shown in FIG. 14 will now be described in additional detail.

In particular embodiments, the processor(s) 1402 includes hardware for executing instructions, such as those making up a computer program. As an example, and not by way of limitation, to execute instructions, the processor(s) 1402 may retrieve (or fetch) the instructions from an internal register, an internal cache, memory 1404, or a storage device 1406 and decode and execute them.

The computing device 1400 includes memory 1404, which is coupled to the processor(s) 1402. The memory 1404 may be used for storing data, metadata, and programs for execution by the processor(s). The memory 1404 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1404 may be internal or distributed memory.

The computing device 1400 includes a storage device 1406 for storing data or instructions. As an example, and not by way of limitation, the storage device 1406 can include a non-transitory storage medium described above. The storage device 1406 may include a hard disk drive (HDD), flash memory, a Universal Serial Bus (USB) drive or a combination these or other storage devices.

As shown, the computing device 1400 includes one or more I/O interfaces 1408, which are provided to allow a user to provide input to (such as user strokes), receive output from, and otherwise transfer data to and from the computing device 1400. These I/O interfaces 1408 may include a mouse, keypad or a keyboard, a touch screen, camera, optical scanner, network interface, modem, other known I/O devices or a combination of such I/O interfaces 1408. The touch screen may be activated with a stylus or a finger.

The I/O interfaces 1408 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1408 are configured to provide graphical data to a display for presentation to a user. The graphical data may be representative of one or more graphical user interfaces or any other graphical content as may serve a particular implementation.

The computing device 1400 can further include a communication interface 1410. The communication interface 1410 can include hardware, software, or both. The communication interface 1410 provides one or more interfaces for communication (such as, for example, packet-based communication) between the computing device and one or more other computing devices or one or more networks. As an example, and not by way of limitation, communication interface 1410 may include a network interface controller (NIC) or network adapter for communicating with an Ethernet or other wire-based network or a wireless NIC (WNIC) or wireless adapter for communicating with a wireless network, such as a WI-FI. The computing device 1400 can further include a bus 1412. The bus 1412 can include hardware, software, or both that connects components of computing device 1400 to each other.

The size of a play file and the retained fragments or stitched images used to simulate a video (e.g., a screencast) according to the above-described embodiments is much smaller in size than the screencast file generated by conventional screencasting software. For example, the size in memory space of the stored play file and the fragments/stitched images is less than 25% of a size of the captured sequence of screenshots. Indeed, depending on the application the recording is applied to, it may be possible to capture 96% less frames and uses 94% less memory than conventional screencasting software. Due to the great reduction in size, embodiments of the disclosure can eliminate use of buffering, handle slow internet connections, and work seamlessly on low latency networks. Embodiments of the disclosure may solve inadequate documentation issues by providing visuals (along with help text) by bridging the gap of having 360-degree updated documentation. Embodiments of the disclosure may provide incisive information to the audience (technical and non-technical) on new features and feature change versions on a granular level. Embodiments of the disclosure may provide a lossless channel of communication from developers to end customers. Further, embodiments of the disclosure may reduce expenses (e.g., storage, training time, etc.) by providing a cloud-based light weight implementation, which is not available in conventional video capture tools. Additionally, embodiments of the disclosure may be configured to support multiple output formats for different applications to enhance the user experience.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

What is claimed is:

1. A cloud-based system that records and plays back video images, the system comprising:
   a cloud-based service comprising a recorder service configured to execute on a host server, the host server configured to connect to a plurality of client devices over a computer network; and
   a client application program stored in the plurality of client devices configured for execution by at least one of the plurality of client devices, the client application program comprising a player program and a recorder program, the recorder program configured to capture a sequence of screenshots based on a pre-defined list of events and send the captured sequence and a build request referencing the sequence across the computer network to the cloud-based service,
   wherein the recorder service is configured to generate a play file in response to receipt of the build request by dividing each of the captured screenshots received across the computer network into a plurality of image fragments, comparing the image fragments between the screenshots to determine variations among the screenshots, determining relevant fragments among the image fragments for each screenshot based on the variations, stitching the relevant fragments of each screenshot to generate a stitched image for each screenshot, and generating the play file including metadata referencing the stitched images, and
   wherein the play file is configured to be accessible by any of the plurality of client devices for generation and playback of a video using the player program.

2. The cloud-based system of claim 1, wherein the recorder program begins performing the capture of the sequence of the screenshots upon a user using the client application program to start a recording and the recorder program sends the build request upon the user using the client application program to stop the recording.

3. The cloud-based system of claim 1, wherein the relevant fragments include all the image fragments of a first one of the screenshots and only the image fragments of a second one of the screenshots adjacent the first screenshot that differ from the image fragments of the first screenshot.

4. The cloud-based system of claim 1, wherein the player program presents the stitched images sequentially on a display device of one of the client devices using the metadata in the play file.

5. The cloud-based system of claim 1, wherein the recorder program determines help text for each of the screen captures from the corresponding event, and includes the help text in the build request.

6. The cloud-based system of claim 5, wherein the recorder service inserts the help text associated with a given one of the screen captures into a part of the metadata associated with the given screen capture.

7. The cloud-based system of claim 6, wherein the player program presents the stitched images along with corresponding help text sequentially on a display device of one of the client devices using the metadata in the play file.

8. The cloud-based system of claim 1, wherein the capture of the sequence of screenshots includes performing a screen capture only when an input device event has occurred on the client device that is present in the pre-defined list of events.

9. The cloud-based system of claim 8, wherein the input device event is one of a keyboard event, a pointer event, or a touch-screen event.

10. The cloud-based system of claim 1, wherein the recorder service resizes the sequence of screenshots prior to performing the divide to match a different screen resolution.

11. The cloud-based system of claim 1, wherein the recorder service compresses the sequence of screenshots prior to performing the divide.

12. The cloud-based system of claim 1, wherein the play file has a JavaScript Object Notation (JSON) format.

13. A computer-implemented method for generating a play file configured to enable play back of video images, comprising:
   storing, by a cloud-based service, screenshots received across a computer network from a client application program;
   generating, by the cloud-based service, a play file in response to receiving a build request from the client application program, the build request referencing a sequence of the screenshots; and
   configuring, by the cloud-based service, the play file to be accessible by the client application program for generation and playback of a video, wherein the generating comprises:
dividing each of the screenshots in the sequence into a plurality of image fragments;
comparing the image fragments between the screenshots to determine variations among the screenshots;
determining relevant fragments among the image fragments for each screenshot based on the variations;
stitching the relevant fragments of each screenshot to generate a stitched image for each screenshot; and
generating the play file including metadata referencing the stitched images.

14. The method of claim 13, wherein the generating further comprises resizing the screenshots in the sequence prior to the dividing to match a different screen resolution.

15. The method of claim 13, wherein the generating further comprises compressing the screenshots in the sequence prior to the dividing.

16. The method of claim 13, wherein a size in memory space of the play file and the stitched images is less than 25% of a size of the sequence of screenshots.

17. The method of claim 13, wherein the build request additionally includes help text for each of the screenshots and the metadata further includes at least some of the help text.

18. A computer-implemented method for managing a client application program to record and play back video images, comprising:
performing, by the client application program using an event handler, a screen capture to create a captured image file each time one of a plurality of pre-defined events occurs;
outputting in sequence the captured image files across a computer network to a cloud-based service;
generating a build request identifying the captured image files and outputting the build request to the cloud-based service; and
accessing a play file received from the cloud-based service, the play file comprising metadata referencing image variations in the captured image files; and
presenting, by the client application program using a player processing the metadata, the image variations sequentially on a display device.

19. The computer-implemented method of claim 18, wherein the event handler returns text for each of the captured image files and the build request includes the text of the captured image files of the sequence.

20. The method of claim 18, wherein the event handler monitors a graphical user interface (GUI) of a client device for an input device event applied to the GUI that is one of the pre-defined events, wherein the input device event is a keyboard event, a pointing device event, or a touch-screen event.

* * * * *